UNITED STATES PATENT OFFICE.

EDGAR SAMSON, OF NEW YORK, N. Y., ASSIGNOR TO CARL F. STIEFEL, OF NEW YORK, N. Y.

CHEMICAL COMPOUND OF CALCIUM CHLORID AND HEXAMETHYLENAMIN AND A PROCESS RELATING TO THE SAME.

1,193,474.      Specification of Letters Patent.      Patented Aug. 1, 1916.

No Drawing.      Application filed March 13, 1914. Serial No. 824,544.

*To all whom it may concern:*

Be it known that I, EDGAR SAMSON, a subject of the King of Great Britain, and resident of the borough of Manhattan, in the city of New York, county and State of New York, have invented a certain new and useful Chemical Compound of Calcium Chlorid and Hexamethylenamin and a Process Relating to the Same, of which the following is a specification.

This invention relates to the general class of therapeutic agents.

Calcium compounds have for some time past been known to possess specially valuable therapeutic properties, as systemic antiphlogistics and hemostatics. Among these, calcium chlorid is generally believed to be the most valuable, but its therapeutic use is made difficult, first, because of the fact that it is strongly hygroscopic, making it technically impossible to produce and maintain it in tablet or other handy form, and, secondly, because it is strongly caustic and irritant, and for this reason has to be taken in greatly diluted, and therefore bulky, form. Hexamethylenamin, on the other hand, has valuable urinary and systemic antiseptic properties, but it is also irritant in the large doses which in case of systemic antisepsis must be given to produce adequate results.

My invention has for its object to provide a new chemical compound in the form of a dry, free-running salt, which is absolutely free from hygroscopic properties, is practically tasteless in the aqueous solution of therapeutic doses, and unites the hemostatic and antiphlogistic properties of calcium chlorid with the antiseptic properties of hexamethylenamin. In this form both drugs can be given in adequate doses, the hexamethylenamin counteracting the disagreeable causticity of the calcium chlorid, and the calcium chlorid tending to prevent bladder and kidney irritation readily leading to hematuria, which large doses of hexamethylenamin are known to frequently produce.

The following represents a method of preparing this compound: Molecular quantities of anhydrous calcium chlorid and hexamethylenamin are dissolved separately in the minimum quantity of water for producing cold saturated solutions—about 11 parts by weight of the calcium chlorid and 14 parts by weight of the hexamethylenamin. The saturated solution of calcium chlorid is then gradually added to the saturated hexamethylenamin solution. In order to maintain these solutions in a cool state, the receptacles are cooled by exterior means, as icing, or its equivalent. By mixing these two solutions, a white crystallized precipitate is obtained, resulting from the combination of one molecular part of calcium chlorid and one molecular part of hexamethylenamin. This crystalline mass or precipitate is then separated by filtration, washed and dried. It is dissolved in alcohol and recrystallized once therefrom, the resulting crystals being an absolutely pure chemical product. The effect of the dissolving is to dissociate and ionize these substances as completely as possible, the dissociated ions being believed to react to form the new compound, free from water of crystallization. A modification of this method is to intimately mix molecular parts of calcium chlorid anhydrous and hexamethylenamin, both in powder form, dissolve this mixture in the minimum quantity of boiling alcohol, from which the chemical compound at once crystallizes upon cooling. The crystallized precipitate is filtered, washed, and dried, and is then, for the purpose of purification, recrystallized once more from alcohol.

It will be seen that in the first process mentioned, the water dissolves the calcium chlorid and also dissolves the hexamethylenamin, and, bringing these two solutions together, bring about a chemical union of these two substances, and by this chemical union a new product is obtained. In case recrystallization is used, this has the advantage of bringing about a very pure product.

In the second process, by bringing the two substances directly together in dry form and making first a mechanical mixture thereof, the addition of the alcohol serves to dissolve each of these substances, and on their dissolving they unite to form a chemical compound.

In place of using an aqueous solution of calcium chlorid and an aqueous solution of hexamethylenamin, I can also use advantageously an aqueous solution of calcium chlorid and an alcoholic solution of hexamethylenamin, or an alcoholic solution of calcium chlorid and an aqueous solution of hexamethylenamin, or an alcoholic solution of calcium chlorid and an alcoholic solution of hexamethylenamin; in other words, the test as to what solvent to be used, is, that it should dissolve either substance sufficiently and bring them together in a dissolved saturated solution under the proportions before mentioned, and also the solvent itself must have no chemical action upon either substance. In other words, the solvent acts as a vehicle to bring the two substances together in the closest possible chemical union. From this it will be seen that any neutral organic or inorganic solvent which will dissolve calcium chlorid on the one hand, and hexamethylenamin on the other hand, when these substances are in the molecular proportions given, will bring about this chemical union, and provided the concentration of both products is properly chosen, the resulting new chemical product will immediately crystallize.

The resulting chemical compound is readily soluble in water and so stable that its aqueous solution can be boiled for a considerable period without noticeably liberating formaldehyde.

The chemical compound is dry, stable, and free running and is capable of being tableted, that is, formed into tablets and is so constituted as to maintain its tablet form and not disintegrate by the moisture of the air, as is not the case with calcium chlorid by itself, which is strongly hygroscopic, so that it is technically impossible to produce and maintain it in tablets, as stated. My new chemical compound thus affords the advantages of calcium chlorid medication in this exact and convenient dosage form, and has therefore this advantageous characteristic in its use as an article of medicine. If the compound is crystallized from alcohol it will be substantially free from water of crystallization, so that the percentage of therapeutically available compound is increased.

The product may be described as follows: A white crystallized powder which gives the characteristic chemical reactions of calcium chlorid and those of hexamethylenamin, but does not present the physical properties of either constituent, and which remains free-running even on continued exposure to the air, owing to the fact that it is non-hygroscopic.

The uses which readily suggest themselves for such a compound are, generally speaking, any condition in which the systemic need for calcium chlorid is indicated, such as all inflammatory conditions, no matter which part of the human organism they affect, eczema and other irritant and itching skin diseases, lobar pneumonia, asthma, hay fever, iritis, etc., and, furthermore, for the prevention and treatment of hemorrhages—prophylaxis of hemorrhage before surgical operations, internal hemorrhage, hemoptysis, epistaxis, aneurysms, post-partum hemorrhages, indolent and gastric ulcers. As to the second constituent, hexamethylenamin, this new compound can be manifestly used in all conditions in which the giving of large and continuous doses of hexamethylenamin are desired and it is of importance to avoid the vesical and renal irritation which would be produced thereby.

I have described my new compound, and several methods of making the same, and I claim as new:

1. As a new article of medicine, the dry, stable, and free running chemical compound of calcium chlorid and hexamethylenamin capable of being tableted and maintained in permanent tablet form.

2. As a new article of medicine, a compound of calcium chlorid and hexamethylenamin, and substantially free from water of crystallization, substantially as described.

3. A method of making a new article of medicine, consisting of the combination of calcium chlorid and hexamethylenamin substantially free from water of crystallization, which consists in dissolving the said calcium chlorid and said hexamethylenamin in a substantially non-aqueous solvent capable of ionizing them and bringing together said non-aqueous solutions and crystallizing the compound formed thereby.

4. A method of forming a new article of medicine consisting of the combination of calcium chlorid and hexamethylenamin and substantially free from water of crystallization, which consists in dissolving molecular quantities of said calcium chlorid and said hexamethylenamin in water, bringing together said solutions, crystallizing the compound thereby formed, and redissolving said compound in a substantially non-aqueous solvent capable of ionizing them, and recrystallizing said compound from said non-aqueous solvent.

5. A method of making a new article of medicine, consisting of the combination of calcium chlorid and hexamethylenamin, which consists in dissolving the said calcium chlorid and said hexamethylenamin in alcohol, and bringing together said alcoholic solutions and crystallizing the compound formed thereby.

In testimony, that I claim the foregoing as my invention, I have signed my name in presence of two subscribing witnesses.

EDGAR SAMSON.

Witnesses:
F. HOGG,
JOS. BISBANO.